United States Patent
Smith

(10) Patent No.: US 6,416,185 B1
(45) Date of Patent: Jul. 9, 2002

(54) MANAGING DIFFERENTIAL FOCUS IN PROJECTION DISPLAYS

(75) Inventor: Ronald D. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/345,288

(22) Filed: Jun. 30, 1999

(51) Int. Cl.[7] .................. G03B 21/00; G03B 21/14; G03B 3/00; H04N 3/23; H04N 3/26

(52) U.S. Cl. .................. 353/69; 353/31; 353/70; 348/746; 348/806; 352/140

(58) Field of Search .................. 353/69, 70, 101, 353/31; 348/745, 746, 806; 352/140

(56) References Cited

U.S. PATENT DOCUMENTS

| | | | | |
|---|---|---|---|---|
| 4,436,392 A | * | 3/1984 | Vanderwerf | 353/38 |
| 4,564,267 A | * | 1/1986 | Nishimoto | 350/379 |
| 4,572,616 A | * | 2/1986 | Kowel et al. | 350/335 |
| 4,601,545 A | * | 7/1986 | Kern | 350/347 |
| 5,114,223 A | * | 5/1992 | Torigoe et al. | 353/101 |
| 5,479,225 A | * | 12/1995 | Kuga | 353/101 |
| 5,537,168 A | * | 7/1996 | Kitagishi et al. | 353/101 |
| 5,597,223 A | * | 1/1997 | Watanabe et al. | 353/97 |
| 5,712,721 A | * | 1/1998 | Large | 359/245 |
| 6,061,102 A | * | 5/2000 | Sheppard et al. | 348/745 |
| 6,220,710 B1 | * | 4/2001 | Raj et al. | 353/20 |

* cited by examiner

Primary Examiner—Christopher Mahoney
Assistant Examiner—Magda Cruz
(74) Attorney, Agent, or Firm—Trop, Pruner & Hu, P.C

(57) ABSTRACT

A system corrects differential focus arising from keystone errors in projection displays. An electrically variable optical element may correct the differential focus of the projected image. The focus of the image may be corrected so that opposed portions of the image, otherwise subject to keystone errors, are both correctly focused.

25 Claims, 5 Drawing Sheets

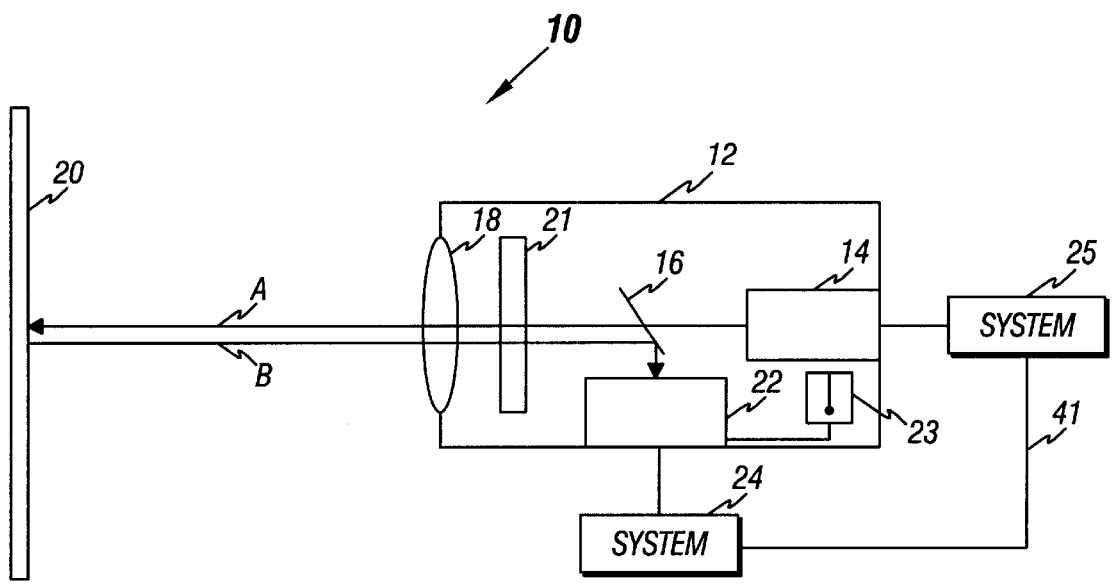
FIG. 1
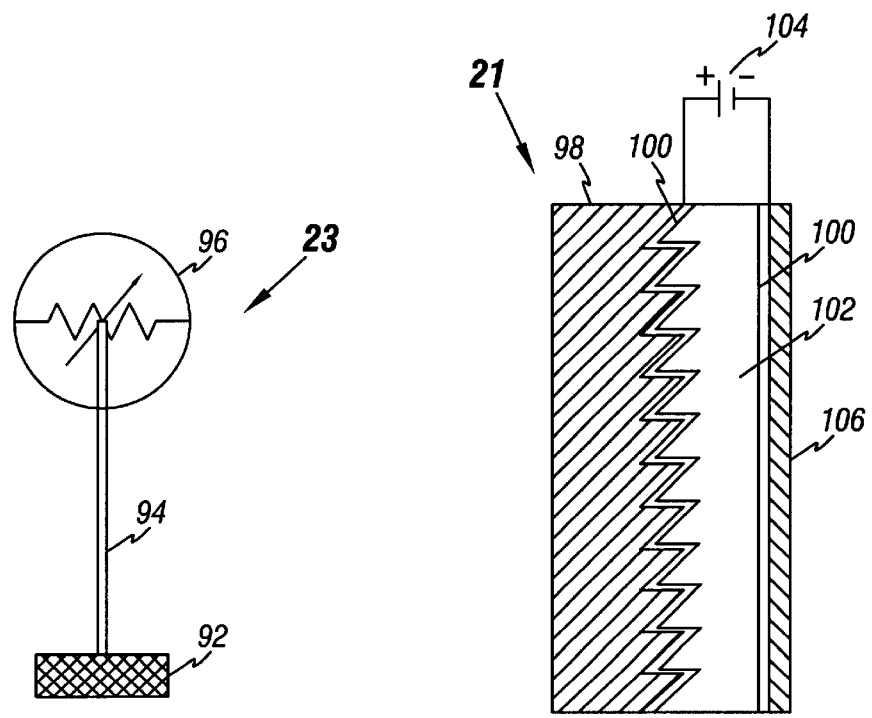
FIG. 2
FIG. 3

MANAGING DIFFERENTIAL FOCUS IN PROJECTION DISPLAYS

BACKGROUND

This invention relates generally to managing differential focusing of projection displays including displays that may display computer information.

Projection displays may project an enlarged image on a display screen to be more easily viewable, for example, by a number of users. Projection display screens may also be mounted in housings with an image projected on one side of a screen, being viewed on the other side of the screen. In some cases, projection displays may be utilized as the displays for computer systems.

Projection displays project onto a display surface by angling the projection display with respect to a horizontal plane. Correct optical projection of the image assumes that the display surface is perpendicular to the axis of projection. Typically, the projection axis is at an angle to the projection surface. As a result, the image that appears on the projection surface no longer has a rectangular aspect ratio but instead is keystone shaped. This is a form of differential focus because the image is not focused everywhere. The keystone shaped image and its differential focus are different manifestations of the same problem. The keystone shaped image is a geometrical projection of a rectangle onto a plane at a angle.

Differential focus arises from the fact that the image plane distance varies because of the angle of projection. Due to the larger f numbers used by projectors, the angle of projection causes a shallow depth of focus.

If one attempts to correct the focus on the bottom portion of the keystone, the focus at the top of the keystone becomes worse and vice versa. There is no simple way to manually adjust the focus to correct the keystone effect.

Thus, there is a continuing need for ways of correct differential focus and keystone errors in projection displays.

SUMMARY

In accordance with one aspect of the present invention, a method of projecting an image on a display surface includes projecting the image through an electrically variable optical element. The focal length of the optical element is adjusted to correct for differential focus.

DESCRIPTION OF THE DRAWINGS

FIG. 1 is a schematic depiction of one embodiment of the present invention;

FIG. 2 is a schematic depiction of a pendulum style tilt indicator;

FIG. 3 is a schematic cross-sectional view of an electrically variable optical element;

DETAILED DESCRIPTION

Figure 5:
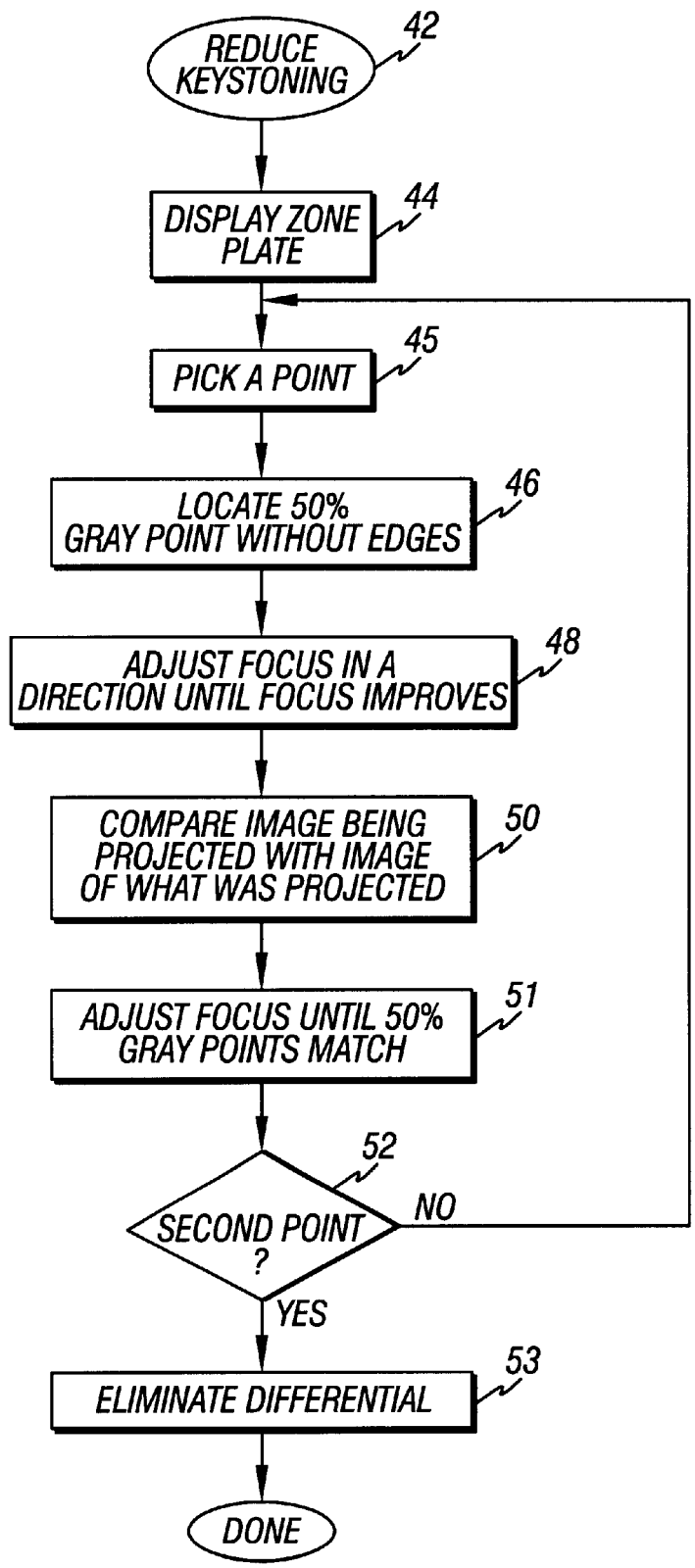
FIG. 5 is a flow chart showing software for implementing another embodiment of the present invention.

Referring to FIG. 1, a projection display 10, in one embodiment of the invention, may include a projection device 12 which projects a light beam A onto a screen 20. As examples, the projection device 12 may use transmissive or reflective liquid crystal techniques or the projection device may be a Schlieren optical projector. The beam A may be reflected by the screen 20, at least in part, back towards the projection device 12. In one embodiment of the invention, the display 10 detects the returning, reflected light beam B using a sensor 22. A system 24 uses information about the returning light to adjust the focus of the display or the system 25 controlling the display. The sensor 22 may include one or more digital video cameras in one embodiment.

In one embodiment of the present invention, the device 12 may include a light valve 14 which generates the output light of the projector. The light valve may include a liquid crystal display (LCD) such as a reflective or a transmissive LCD. That output light may pass unaffected through a beam splitter 16 to be projected onto the screen 20 using a projection lens 18. Returning, reflected light, indicated as B in FIG. 1, passes back through the lens 18 and is reflected by the beam splitter 16 to be captured by the sensor 22. The beam B may convey information about the focus of the image displayed on the screen 20.

The light valve 14 may receive a video signal from a processor-based system 25 while the sensor 22 may be coupled to a processor-based system 24. For example, the systems 24 and 25 may be coupled by a bus 41 which may be a Video Electronics Standards Association (VESA) interface. The VESA standard is further described in the Computer Display Timing Specification v.1, rev. 0.8, (available from VESA, San Jose, Calif. 95131 or on the Internet at www.vesa.org/standards.html). Alternatively, a digital interface may be used as described in the Digital Visual Interface (DVI) Specification, Revision 1.0, Apr. 2, 1999, prepared by the Digital Display Working Group (DDWG).

In one embodiment of the present invention, a tilt indicator 23 may be coupled to the sensor 22 and the system 24. One embodiment of the tilt indicator 23, shown in more detail in FIG. 2, may include a pendulum 94 with a small weight 92 on one end and an angular potentiometer 96 on the other end. When the projection device 12 is tilted, for example to project an image further up a display surface 20, the tilt indicator 23 indicates the angle of tilt. In particular, the weight 92 keeps the pendulum 94 relatively aligned with gravitational force resulting in a pivoting action of the upper end of the pendulum 94 relative to the angular potentiometer 96. The tilt indicator 23 produces a electrical signal indicative of the degree or angle of tilt of the projection device 12. In this way, the system 24 may receive information about the orientation of the projection device 12 and thereby, by geometric transformation, the extent of keystoning which may result due to the angle between the axis of projection of the device 12, indicated by the arrow A in FIG. 1, and the display surface 20.

An electrically variable optical element 21 may be positioned along the projection axis such that the image projected along the axis A and the returning image along the axis B, pass through the element 21. The element 21 electrically manages the differential focus arising from keystoning. That is, the element 21 is designed to produce the desired optical effect to correct the keystoning distortion.

Referring to FIG. 3, the element 21 may include a birefringent lens 98 which may be flat lens such as a Fresnel, a flat diffractive optic or a holographic plate. In any case, the lens 98 provides the maximum differential focus correction. Its effect may be moderated by varying the voltage on the electro-optic material 102.

The electro-optic material 102 is confined between electrodes 100 which may be formed, for example, of indium tin oxide (ITO) or any other transparent conductive material. The optical properties of the electro-optic material 102 may be varied by a varying the potential applied from a potential source 104 to the electrodes 100. A light transmissive top plate 106 completes the assembly.

The effect of the combination of the birefringent lens 98 and the electro-optic material 102 is to produce an aspheric optic which counteracts the keystoning effect to an electrically programmable degree. The greater the keystoning detected by the tilt indicator or from the returning light B, the greater the keystoning correction provided by the optical element 21.

Electro-optic materials such as liquid crystal materials have an optical anisotropy that cause their index of refraction to vary according to the angle of their molecules. The angle of their molecules is a function of any alignment layers and the torque supplied by an externally applied voltage. This variable angle varies the index of refraction between the so-called ordinary and extraordinary indices, rotating the angle of the polarized light. The variation of this angle is in the plane to the display.

As the angle is varied, the effect is to smoothly vary the index of refraction between the maximum extremes of the ordinary and extraordinary indices. The birefringent lens produces a different focal length for each polarization of light incident upon it. The electro-optic material 102 may have the property that it may select one of the polarization states of light incident on it according to the applied electrical field. Consequently, a liquid crystal material may be used to select from among the focal lengths of the birefringent lens 98. An electrically variable optical element is described for example in U.S. Pat. 5,712,721, assigned to Technology Partnership, PLC. The element 21 is "electrically variable" because its focal properties may be changed in response to an electric or magnetic field.

Figure 4:
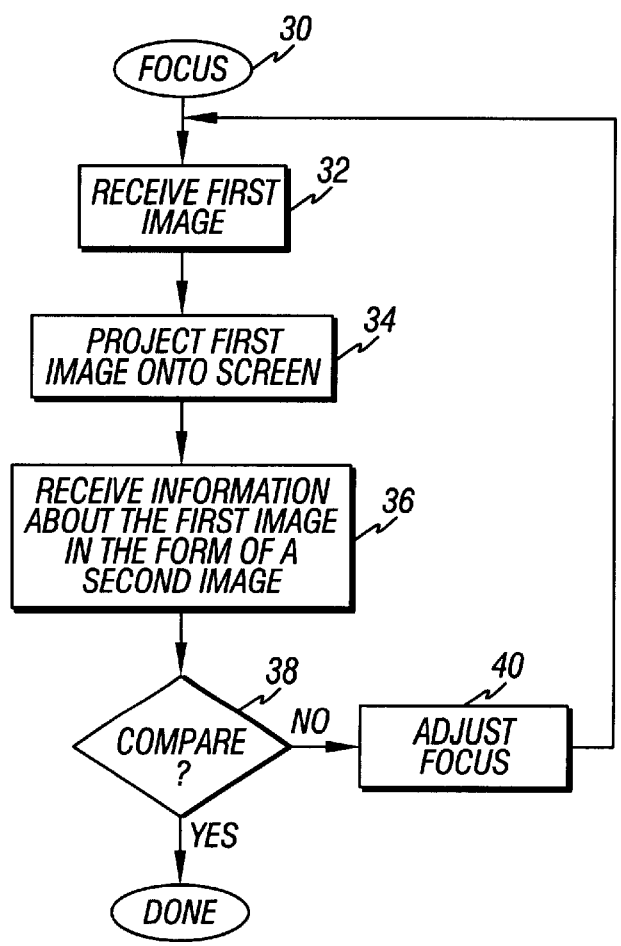
FIG. 4 is a flow chart showing software for implementing one embodiment of the present invention.

Referring next to FIG. 4, the software 30 for providing an autofocus feature in the embodiment shown in FIG. 1 may begin by receiving a first image to be displayed by the light valve 14 as indicated at block 32. The first image is then projected onto a screen 20 using the projection device 12, as indicated in block 34. Information about the first image is received, in the form of a second image, by the sensor 22, as indicated in block 36.

The image received for projection in the light valve 14 from the system 25 and the image received by the sensor 22 and the system 24 are then compared as indicated in diamond 38. If they are sufficiently similar in focus, as explained hereinafter, the flow ends. Otherwise, the focus is adjusted as indicated in block 40. Conventional and differential focus corrections may be made automatically.

Referring next to FIG. 5, software 42 for implementing a more detailed embodiment of an autofocus feature for embodiments of the type shown in FIG. 1 begins by displaying a circular zone plate as indicated at block 44. A zone plate includes a plurality of circles of decreasing intra-circle spacing as shown in a simplified depiction in FIG. 6.

The image of the zone plate displayed by the projection system is then analyzed to locate a first line and a point along the line (block 45) of 50 percent scale gray value without edges, in one embodiment of the invention. This corresponds to the point where the adjacent circles merge together to form a 50 percent gray scale image without showing circle edges, as indicated in block 46.

The focus is then adjusted in either of two directions, either towards or away from the projection screen, until the focus sharpens. In other words, the focus is adjusted in a first direction to determine if the focus improves and then in a second direction if the focus did not improve by the adjustments in the first direction, as indicated in block 48.

Next, the projected image is compared with the image of what was projected as indicated in block 50. If the point of the 50 percent gray scale is at the same radial distance, or substantially the same radial distance (the distance R1 for example, on the zone plate shown in FIG. 6) in both images, the display is substantially in focus along the line R1. Otherwise, the focus is adjusted until the 50 percent gray scale points substantially match as indicated in block 51.

Figure 6:
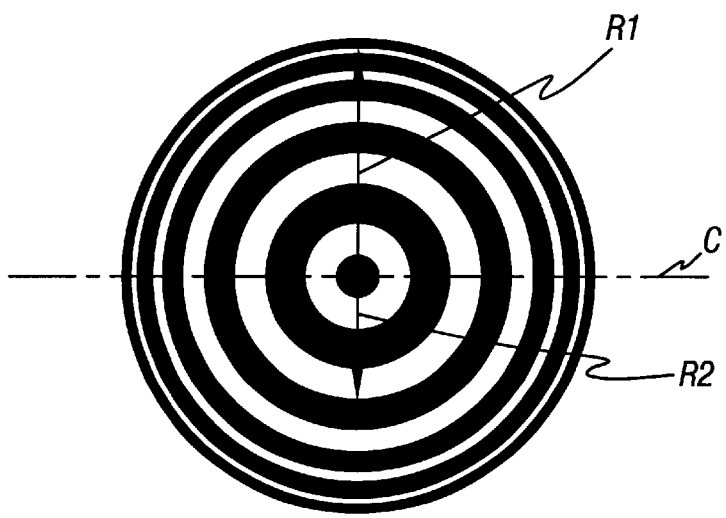
FIG. 6 is a simplified depiction of a circular zone plate.

After the focus has been completed along a first line R1 for example, a second line R2, shown in FIG. 6, and a point along the second line may be chosen and the procedure may be repeated for the second line as indicated in FIG. 5. The focal corrections along each line R1 and R2 are determined. Thus, if the lines R1 and R2 are on different sides of a central horizontal axis C shown in FIG. 6, the differential focus that they indicate is a measure of the differential focus arising from the keystone error due to tilting the projector up or down.

Once the two focal adjustments have been determined as indicated in diamond 52 in FIG. 5, the differential focus may be eliminated as indicated in block 53 using the electrically variable optical element 21. Namely, a potential is applied to aspherically alter the light passing through the element to correct the keystoning effect.

Figure 9:
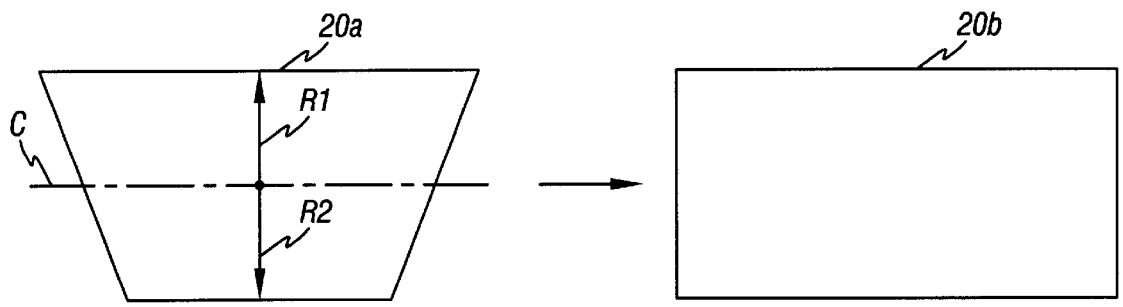
FIG. 9 is a layout showing the effect of the electrically variable optical element in correcting differential focus.

Referring to FIG. 9, an image 20a projected on the projection surface 20 may be subject to keystone distortion as indicated on the left in FIG. 9. As a result, there is differential focus about the axis C. Therefore, by obtaining a focal correction along the line R1 and the line R2, the differential focus can be quantified. As a result of the correction applied through the electrical variable optical element 21, a rectangular image 20b may be projected on the surface 20 as indicated on the right in FIG. 9.

Figure 7:
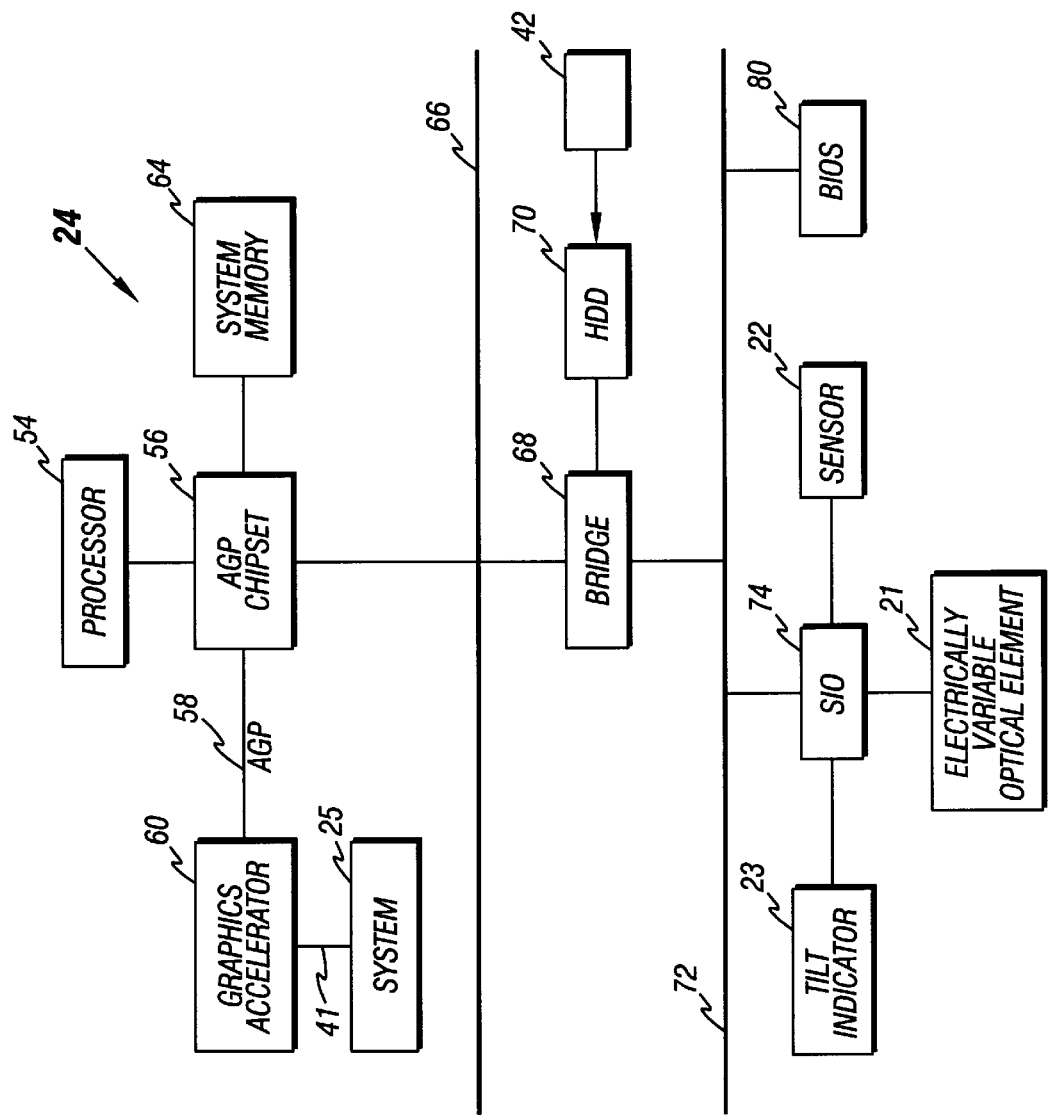
FIG. 7 is a block diagram showing one embodiment for implementing a computer which drives a projection display.

Referring to FIG. 7, in one embodiment, the system 24 may include a processor 54 coupled to an accelerated graphics port (AGP) chipset 56 for implementing an accelerated graphics port embodiment (see the Accelerated Graphics Port Interface Specification, version 1.0, published on Jul. 31, 1996, by Intel Corporation, Santa Clara, Calif.). The chipset 56 may communicate with the AGP port 58 and the graphics accelerator 60. The system 25 may be coupled by the bus 41 to receive the output signal from the graphics accelerator 60. The system 25 may use a display controller which provides appropriate corrections (such as color or gamma correction) for the given type of display. The display controller may also include an appropriate frame buffer and timing generator. The chipset 56 may also be coupled to the system memory 64 and to a bus 66.

The bus 66 may be coupled to a bridge 68 which in turn is coupled to a hard disk drive 70. The hard disk drive may store the software 30 or 42 in one embodiment of the present invention for execution by the processor 54.

The bridge 68 may also couple another bus 72 which is in turn coupled to a serial input/output (SIO) device 74. The device 74 may allow serial communication with the sensor 22, the tilt indicator 23 and the electrically variable optical element 21. Also coupled to the bus 72 is a basic input/output system (BIOS) 80.

Figure 8:
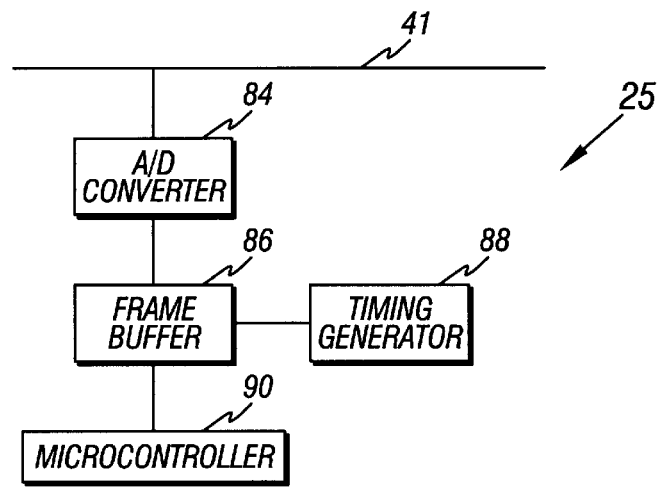
FIG. 8 is a block diagram of one embodiment of hardware for controlling a projection display.

Turning next to FIG. 8, in one embodiment, the system 25 for controlling the light valve 14 may be coupled to a bus 41, such as a VESA local bus. The bus 41 in turn is coupled to an analog to digital converter 84. The converter 84 may receive information from a frame buffer 86 controlled by a timing generator 88. A microcontroller 90 may store information for controlling the light valve 14. For example, the microcontroller 90 may store information which provides gamma correction and color conversions for a particular display or light valve.

The system 24 may implement the differential focus corrections automatically in response to tilt information from the tilt indicator 23 or using the feedback technique illustrated in FIGS. 1 and 4. Alternatively, the power of the optical element 21 may be fine tuned by hand by the operator. As still another alternative, the focus may be adjusted by simply measuring the angle of tilt and manually inputting the appropriate correction to the system 24 and element 21.

Normally, projectors are designed to project upwardly or downwardly. For example, table mounted projectors usually project upwardly to the display surface. Conversely, ceiling mounted projectors are designed to project downwardly to the display screen. Thus, the optical element 21 may correct for the keystoning effect arising from either upward or downward projection. That is, the optical element 21 need only correct for either the keystone with a wider bottom edge or wider top edge. This simplifies the design of the optical element. Of course, more than one optical element may be provided to enable the system to work on either upwardly or downwardly projected images. For example, a shutter mechanism may be provided to move one or the other of two electrically variable optical elements into the projection axis depending on whether the projector projects upwardly or downwardly. In addition, a pair of such elements may be provided in series along the projection axis. One of the elements may be electrically selected while the other is electrically deselected.

While the present invention has been described with respect to a limited number of embodiments, those skilled in the art will appreciate numerous modifications and variations therefrom. For example, the angular deflection of the pendulum 94 may be detected by other angular detectors instead of the angular potentiometer 96. As an additional example, an optical encoder wheel with periodic angular slots may be used. The passage of the slots may be optically counted to measure angular displacement. As another example, a mirror may be mounted on the pendulum. As the pendulum rotates, the amount of light produced by a fixed light source and detected by a fixed photodetector, reflected from the mirror varies with angular displacement. It is intended that the appended claims cover all such modifications and variations as fall within the true spirit and scope of the present invention.

What is claimed is:

1. A method of projecting an image on a display surface comprising:
   projecting the image through an electrically variable optical element including electro-optic material; and
   adjusting the focal length of the optical element to correct for keystoning.

2. The method of claim 1 further including:
   forming a first image;
   projecting said first image onto a display surface to form a second image;
   receiving information about said second image reflected from said surface; and
   comparing said information about said second image to the information about said first image.

3. The method of claim 2 further including splitting said light path such that outgoing light is passed and incoming radiation is reflected to a detector.

4. The method of claim 2 further including developing signals based on said information to correct the focus of the second image.

5. The method of claim 2 wherein projecting said first image includes projecting an image of a zone plate.

6. The method of claim 5 wherein comparing includes comparing information about the distance from the center of said zone plate image to the point where said zone plate image reaches a predefined gray level.

7. The method of claim 6 further including comparing information about the distance from the center of said zone plate image to a pair of points.

8. The method of claim 7 further including selecting said points to be on opposite sides of the horizontal center line of said zone plate image.

9. The method of claim 1 further including measuring the angle of projection of said image.

10. The method of claim 9 further including using said measurement to automatically adjust the focal length of the optical element to correct for differential focus.

11. An article comprising a medium for storing instructions that cause a processor-based system to:
    obtain an indication of the extent of keystoning of an object; and
    adjust the focal length of an electrically variable optical element including electro-optic material to correct for keystoning.

12. The article of claim 11 further storing instructions that cause a processor-based system to receive information about an image reflected from a projection display surface and to compare information about the reflected image to information about the image that was projected by the projector.

13. The article of claim 12 further storing instructions that cause a processor-based system to develop signals based on said information to correct the focus of the projected image.

14. The article of claim 13 further storing instructions that cause a processor-based system to compare information about the distance from the center of a projected zone plate image to the point where the zone plate image reaches a predefined gray level.

15. The article of claim 14 further storing instructions that cause a processor-based system to compare information about the distance from the center of the zone plate image to a pair of opposed points.

16. The article of claim 15 further storing instructions that cause a processor-based system to select said points on opposite sides of a horizontal center line of a zone plate image.

17. A projection system comprising:
    a projector adapted to project an image along a projection axis onto a display surface; and
    an electrically variable optical element including electro-optic material, positionable along the projection axis of the projector, said element adapted to correct for keystoning.

18. The system of claim 17 including a tilt indicator adapted to measure the angle between the projection axis and the display surface.

19. The system of claim 17 further including:
    a beam splitter arranged to allow light from said projector to pass and to reflect radiation returning towards the projector;

a sensor arranged to detect radiation reflected by said beam splitter; and a comparator adapted to compare information about an image projected by said projector to information about the image received by said sensor.

20. The system of claim 19 wherein said sensor is coupled to a controller adapted to provide signals for correcting the focus of said image projected by said projector.

21. The system of claim 17 wherein said optical element includes an electro-optic material and a pair of electrodes sandwiching said material.

22. The system of claim 21 wherein said optical element includes a birefringent lens.

23. The system of claim 22 wherein said lens is adapted to provide the maximum correction of keystoning and said electro-optic material is adapted to control and moderate said correction.

24. The system of claim 22 wherein said lens is a flat lens.

25. The system of claim 24 wherein said flat lens is a Fresnel lens.

* * * * *